United States Patent
Coogan

(10) Patent No.: US 12,490,672 B2
(45) Date of Patent: Dec. 9, 2025

(54) LAWN TRIMMER

(71) Applicant: TriMower Ltd., Kent (GB)

(72) Inventor: Samuel Coogan, Kent (GB)

(73) Assignee: Gliding Innovations Ltd., Kent (GB)

( * ) Notice: Subject to any disclaimer, the term of this patent is extended or adjusted under 35 U.S.C. 154(b) by 193 days.

(21) Appl. No.: 18/572,003

(22) PCT Filed: Jun. 24, 2022

(86) PCT No.: PCT/EP2022/067426
§ 371 (c)(1),
(2) Date: Dec. 19, 2023

(87) PCT Pub. No.: WO2023/274891
PCT Pub. Date: Jan. 5, 2023

(65) Prior Publication Data
US 2024/0276911 A1      Aug. 22, 2024

(30) Foreign Application Priority Data
Jun. 28, 2021   (GB) ..................................... 2109306

(51) Int. Cl.
*A01D 34/416*     (2006.01)
*A01D 34/73*      (2006.01)
(Continued)

(52) U.S. Cl.
CPC .......... *A01D 34/4167* (2013.01); *A01D 34/73* (2013.01); *A01D 34/78* (2013.01); *A01D 2101/00* (2013.01)

(58) Field of Classification Search
CPC ..... A01D 34/4167; A01D 34/73; A01D 34/78
See application file for complete search history.

(56) References Cited

U.S. PATENT DOCUMENTS

| 2,318,430 A | * | 5/1943 | Spahn | .................... A01D 34/90 30/276 |
| 4,823,464 A | * | 4/1989 | Gorski | ............... A01D 34/4167 30/276 |

(Continued)

FOREIGN PATENT DOCUMENTS

| AU | 2015101710 A4 | 12/2015 |
| GB | 2459100 B | 10/2009 |
| WO | 2005004580 A1 | 1/2005 |

OTHER PUBLICATIONS

International Search Report and Written Opinion for PCT Application No. PCT/EP2022/067426 dated Oct. 20, 2022.

*Primary Examiner* — Sean M Michalski
(74) *Attorney, Agent, or Firm* — Bracewell LLP; Keith R. Derrington

(57) ABSTRACT

A lawn trimmer (100) comprising: a powered cutting tool (112) comprising a motor operably coupled to a rotatable cutter holder (120), the rotatable cutter holder (120) being operably coupled to a cutting piece (122). The rotatable cutter holder (120) has a forward side and first and second lateral sides. A guard (116) is configured to extend substantially from the first lateral side to the second lateral side around the front side of the rotatable cutter holder (120). The guard (116) is configured to provide space for the cutting piece (122) to rotate freely within the guard (116) and is an apertured barrier that provides a protective buffer between the cutting piece (122) and a ground surface, thereby preventing engagement of the rotatable cutter holder (120) with the ground surface when the powered cutting tool (112) is translated over the ground surface.

15 Claims, 3 Drawing Sheets

(51) Int. Cl.
*A01D 34/78* (2006.01)
*A01D 101/00* (2006.01)

(56) References Cited

U.S. PATENT DOCUMENTS

| | | | | |
|---|---|---|---|---|
| 4,890,389 A * | 1/1990 | Whitkop | A01D 34/90 | 30/286 |
| 5,010,720 A * | 4/1991 | Corsi | A01D 34/828 | 56/320.1 |
| 5,048,187 A * | 9/1991 | Ryan | A01D 34/4167 | 30/276 |
| 5,060,383 A * | 10/1991 | Ratkiewich | A01D 75/206 | 30/276 |
| 5,423,126 A * | 6/1995 | Byrne | A01D 34/84 | 30/286 |
| 5,584,348 A * | 12/1996 | Butler | A01D 75/206 | 172/13 |
| 5,924,205 A * | 7/1999 | Sugihara | A01D 34/4167 | 30/286 |
| 5,950,317 A * | 9/1999 | Yates | A01D 34/84 | 30/296.1 |
| 5,996,234 A * | 12/1999 | Fowler | A01D 34/90 | 30/276 |
| 6,892,461 B2 * | 5/2005 | Peterson | A01D 75/206 | 30/286 |
| 7,963,041 B1 * | 6/2011 | Smith | A01D 34/416 | 30/286 |
| 8,769,830 B1 * | 7/2014 | Brown | A01D 34/90 | 30/276 |
| 9,854,738 B2 * | 1/2018 | Miller | A01D 34/90 | |
| 10,555,459 B1 * | 2/2020 | Crockett | A01D 34/416 | |
| 11,234,364 B1 * | 2/2022 | Welch | A01D 34/4167 | |
| 2002/0116827 A1 * | 8/2002 | Richardson | A01D 34/4167 | 30/286 |
| 2013/0031788 A1 * | 2/2013 | Ohno | A01D 34/4167 | 30/276 |
| 2016/0262306 A1 * | 9/2016 | Macedonio | A01D 34/4167 | |

* cited by examiner

LAWN TRIMMER

FIELD

The present invention relates to a lawn trimmer of the type that, for example, comprises a powered cutting tool carrying a rotatable cutting piece.

BACKGROUND

In the field of lawn trimmers, it is known to provide a handheld lawn trimmer comprising a motor, which is typically electric driven, but can be petrol driven. The motor is operably coupled to a cutting piece that is rotatably mounted. Different implementations of the cutting piece exist. Common implementations include one or more portions of nylon flex or a solid elongate cutting piece formed from a plastic material.

The cutting piece, and the motor to which the cutting piece is coupled, are operably coupled to one end of a stalk and a handle is provided at the other end of the stalk for grip and holding of the lawn trimmer by a user. For electric implementations, a power cable is provided for coupling to an electrical circuit operably coupled to the motor. Alternatively, the lawn trimmer can comprise a rechargeable battery to power the electric motor. When the lawn trimmer is in use, the user typically passes a lowermost part of the lawn trimmer carrying the cutting piece over a lawn to be trimmed using a left to right sweeping motion of the handle as the user advances in a forward direction.

The cutting piece is attached to the motor via a rotatable cutter holder. When in use, the cutter piece is free to rotate and cuts grass that attempts to obstruct the rotating cutter piece. However, during use the cutter holder and/or the cutting piece are at risk of engaging with the ground from which the lawn is growing owing to the imprecise nature in which the lawn trimmer is wielded. In this regard, the cutter holder and/or the cutter piece can snag on the ground or contact obstructions that are stronger that grass, which can lead to damage to the cutter piece and possibly other parts of the lawn trimmer, for example the cutter holder.

SUMMARY

According to a first aspect of the present invention, there is provided a lawn trimmer comprising: a powered cutting tool comprising a motor operably coupled to a rotatable cutter holder, the rotatable cutter holder being operably coupled to a cutting piece; and a guard; wherein the rotatable cutter holder has a forward side and first and second lateral sides; the guard is configured to extend substantially from the first lateral side to the second lateral side around the front side of the rotatable cutter holder; the guard is configured to provide space for the cutting piece to rotate freely within the guard; and the guard is an apertured barrier that provides a protective buffer between the cutting piece and a ground surface, thereby preventing engagement of the rotatable cutter holder with the ground surface when the powered cutting tool is translated over the ground surface.

The guard may extend so as to provide a predetermined curvature. The guard may comprise an undertray portion having the predetermined curvature; the predetermined curvature may extend from side-to-side laterally; and the predetermined curvature may be substantially parabolic.

The guard may be a cage. The guard may be a frame. The guard may be a wire frame.

The guard may define an opening at the forward side of the rotatable cutter holder; the opening may be configured to receive, when in use, grass therethrough. The opening may be configured to guide, when in use, grass to the cutting piece.

The cutting piece may be a plastic cord or a moulded cutter.

The trimmer may further comprise a stalk having a first end operably coupled to the powered cutting tool; and a second end may comprise a handle.

The guard may be removable.

The guard may comprise a first stem and a second stem spaced from the first stem; and the powered cutting tool may comprise a first mounting point and a second mounting point respectively configured to receive securably the first stem and the second stem.

The guard may be open at lateral sides thereof to permit the passage, when in use, of grass therethrough while preventing contact of the cutting piece with the ground surface or a lateral object.

The guard may comprise a support frame and an undertray portion depending downwardly from the support frame and beneath the support frame.

The undertray portion may be substantially parallel with and in spaced relation to the support frame.

The undertray portion may comprise a lateral first wing portion. The undertray portion may comprise a second lateral wing portion.

The trimmer may comprise a solid protective cover that may be coupled to the powered cutting tool, when in use. The protective cover may be substantially semi-circular. The protective cover may be configured to carry a circumferential side wall.

The guard may be a curved frame; the frame may comprise downwardly depending lateral curved portions.

The guard may be longitudinally elongate and laterally curved in shape.

It is thus possible to provide a lawn trimmer that obviates or at least mitigates snagging and/or contact of the cutter piece or other lower parts of the lawn trimmer with the ground or other objects owing to the imprecise nature of manipulation of the lawn trimmer. The lawn trimmer also facilitates improved manipulation of the lower part of the lawn trimmer over the ground, thereby enabling users to pass the lawn trimmer over the ground with improved fluidity of motion. Furthermore, the provision of a guard provides a degree of consistency in the resulting length of grass following cutting with the lawn trimmer.

BRIEF DESCRIPTION OF THE DRAWINGS

At least one embodiment of the invention will now be described, by way of example only, with reference to the accompanying drawings, in which.

DETAILED DESCRIPTION OF THE EXAMPLE EMBODIMENTS

Figure 1:
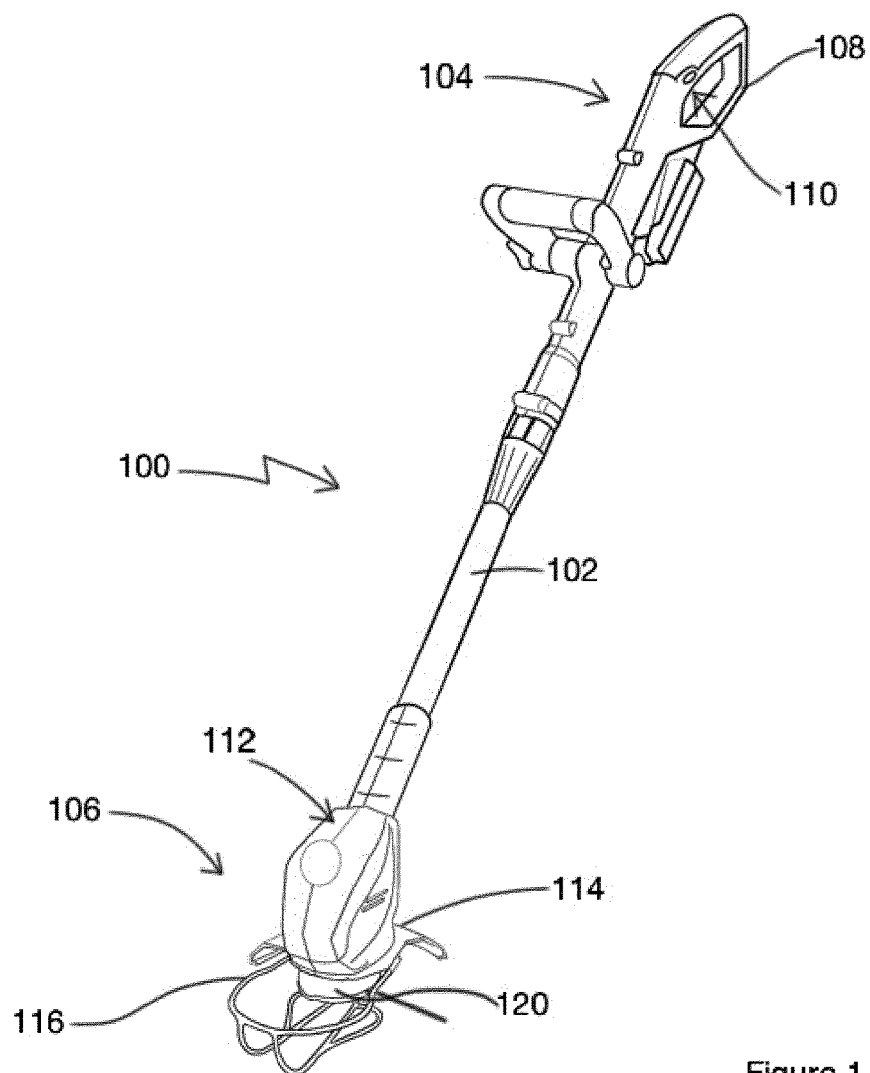
FIG. 1 is a schematic diagram of a lawn trimmer constituting an embodiment of the invention.

Throughout the following description, identical reference numerals will be used to identify like parts.

Figure 2:
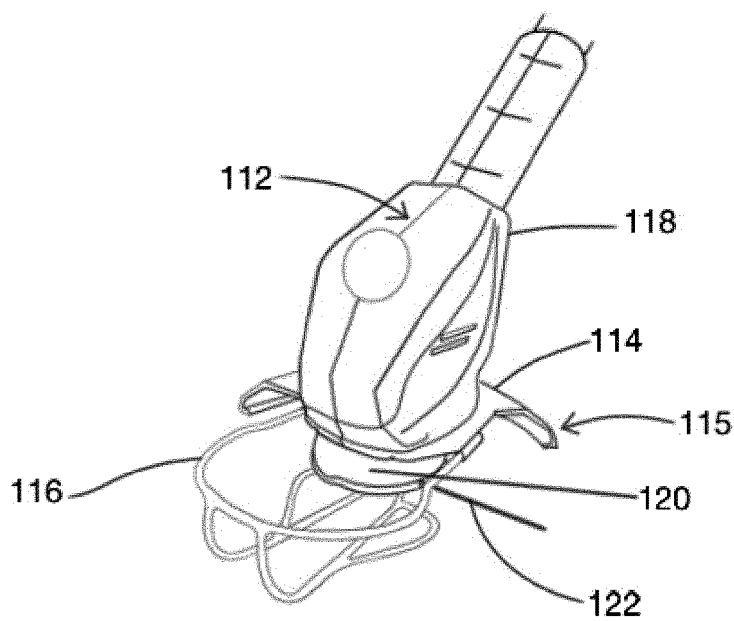
FIG. 2 is a schematic diagram of a lower portion of the lawn trimmer of FIG. 1 in greater detail

Referring to FIGS. 1 and 2, a lawn trimmer 100 comprises a stalk 102 formed, for example, from a tubular material such as metal and having a proximal end 104 and a distal end 106. A handle 108 and an adjacent switching mechanism 110 are provided at the proximal end 104 of the stalk 102. A powered cutting tool 112 is provided at the distal end 106 of the stalk and operably coupled thereto. The powered cutting tool 112 is also operably coupled to the switching mechanism 110. The lawn trimmer 100 also comprises a protective cover 114 and a guard 116. The protective cover 114 is, in this example, solid and disposed above a rotatable cutter holder 120, when in use. The protective cover 114 is, in this example, substantially semicircular and configured to carry a circumferential side wall 115.

The powered cutting tool 112 comprises a housing 118 containing electrical control and driving circuitry, a battery and an electric motor. As these features are not salient with respect to an understanding of the examples of the invention set forth herein, they are not shown in the figures and, for the sake of conciseness and clarity of description, will not be described in greater detail herein. The electric motor comprises a drive shaft (not shown) carrying the rotatable cutter holder 120, the rotatable cutter holder 120 fixedly carrying a cutting piece 122. The cutting piece 122 is, in this example, a moulded single blade formed from a plastics material. However, the skilled person will appreciate that other kinds of cutting piece 122 can be employed for example one or more, such as two, pieces of flex, such as nylon flex extending away from each other towards substantially diametrically opposite points.

Figure 3:
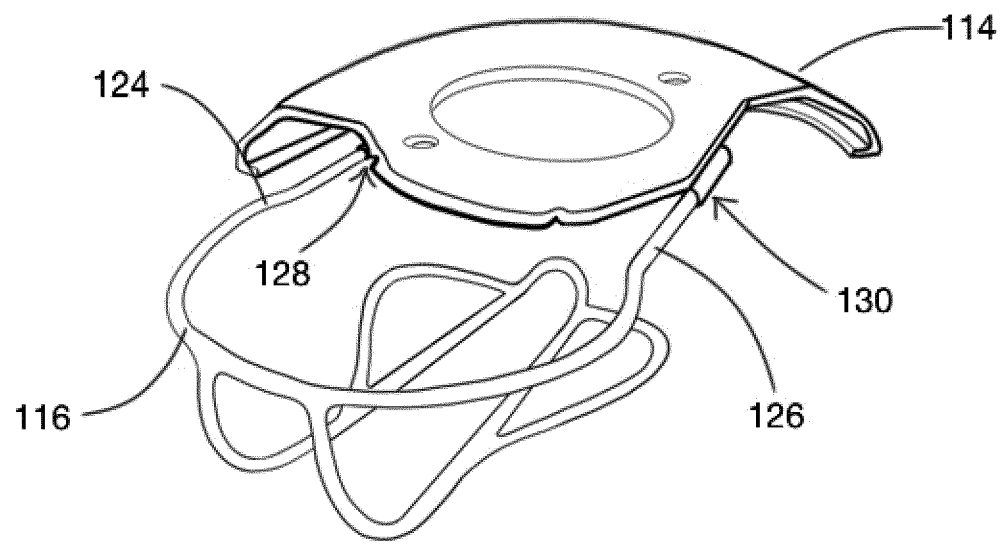
FIG. 3 is a schematic diagram of a wire guard coupled to a protective cover detached from the lawn trimmer of FIGS. 1 and 2.

Referring to FIG. 3, the guard 116 is removably coupled to the powered cutting tool 112, for example by way of being removably coupled to the protective cover 114, which when in use is operably coupled to the powered cutting tool 112. The guard 116 comprises a first stem 124 and a second stem 126, the first and second stems 124, 126 being substantially parallel with respect to each other in this example.

In this example, the protective cover 114 is considered part of the powered cutting tool 112, and the protective cover 114 comprises a first mounting point 128 and a second mounting point 130 for receiving respective ends of the first and second stems 124, 126. However, in other examples, the protective cover 114 can be detachable from the cutting tool 112. The first and second mounting points 128, 130 are configured to securably, but also in this example removably, receive the free ends of the first and second stems 124, 126. In this example, the free ends of the stems 124, 126 and the first and second mounting points 128, 130 are configured to provide complementary halves of a push fit configuration. However, in other examples, the guard 116 can be attached to other parts of the powered cutting tool 112, for example the housing 118 of the powered cutting tool 112.

Figure 4:
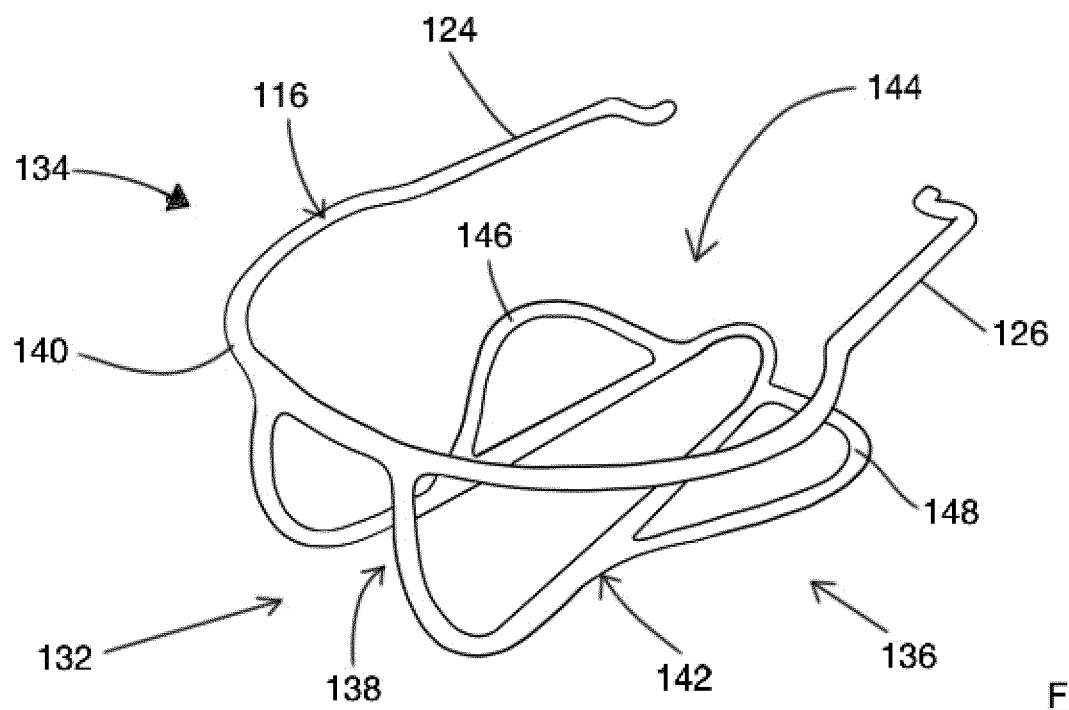
FIG. 4 is a schematic diagram of the wire guard of FIG. 3 in greater detail and from a first perspective.
Figure 5:
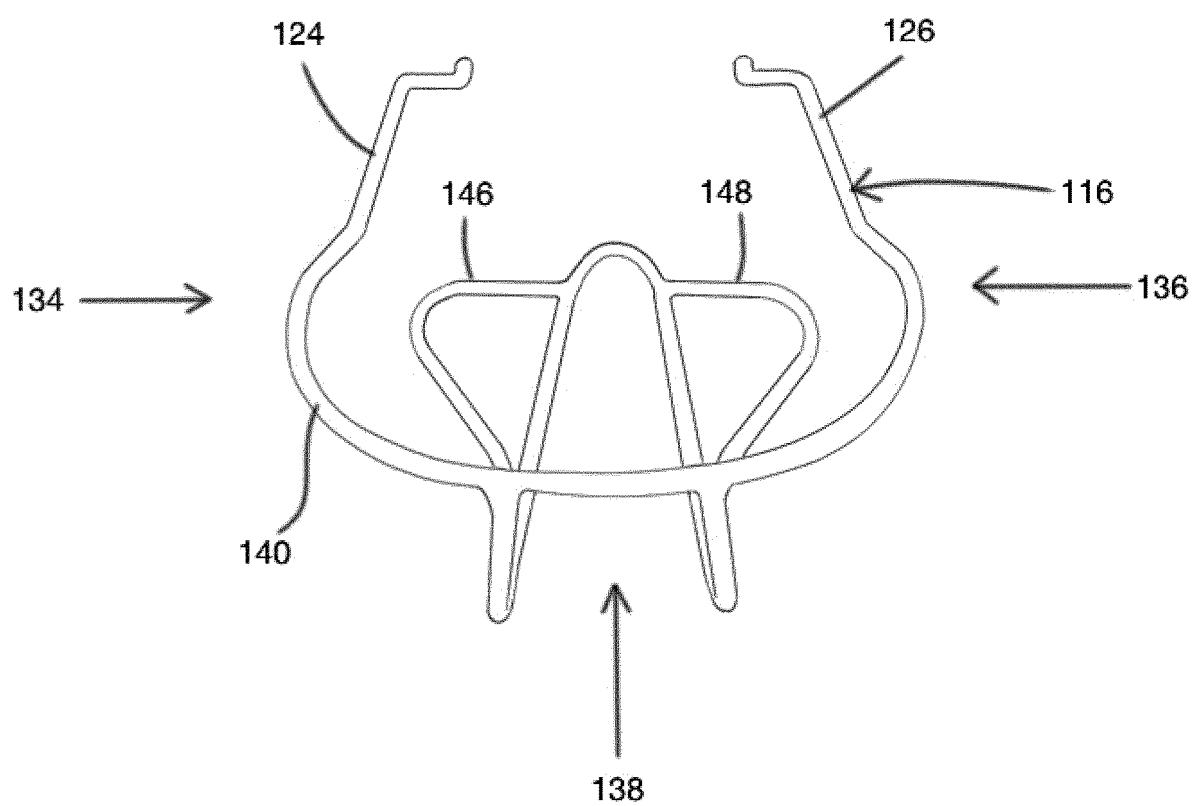
FIG. 5 is a schematic diagram of the wire guard of FIG. 3 in greater detail and from a second perspective.

Turning to FIGS. 4 and 5, the guard 116 is formed, in this example, as a frame, for example from metal wire sufficiently thick to withstand physical shock during normal operation of the lawn trimmer 100. The guard 116 is therefore a cage that is configured to surround the rotatable cutter holder 120 and the cutting piece 122. In this regard, the guard 116 serves as an apertured barrier that provides a protective buffer between the cutting piece 122 and the ground surface when in use.

The guard 116 comprises a forward side 132 and a first lateral side 134 and a second lateral side 136, the forward direction being with respect to a direction of travel of the lawn trimmer 100 during normal use. The guard 116 comprises an opening 138 at the forward side 132 thereof, the opening being configured, for example shaped and sized, to receive grass to be cut therethrough when in use. Furthermore, in this example, the opening 138 is shaped to guide, when in use, the grass to the cutting piece 122 for cutting. Similarly, the guard 116 comprises openings at the first and second lateral sides 134, 136 thereof to permit passage of grass, when in use, therethrough. This aspect is useful as the lawn trimmer 100 is typically swung gently in a side-to-side motion while the user advances holding the lawn trimmer 100 and so the guard 116 can permit grass to be cut to reach the cutting piece 122 while preventing contact of the cutting piece 122 with the ground surface or a lateral object or obstacle.

The guard 116 comprises a support frame 140 from which, in this example, an undertray portion 142 depends. In this example, the undertray portion 142 is apertured and extends downwardly from the front of the support frame 140 and beneath the support frame 140. The undertray portion 142 comprises a substantially parallel apertured portion that extends in spaced relation to the support frame 140 and thus to provide a protective volume 144. The substantially parallel apertured portion carries a first lateral wing portion 146 extending towards the first lateral side 134 and a second lateral wing portion 148 extending towards the second lateral side 136. Both the first and second wing portions 146, 148 are angled slightly towards the support frame 140 and are, in this example, approximately triangular in shape.

The first and second wing portions 146, 148 substantially follow a curved surface that facilitates gliding of the guard 116 over a surface, for example the ground, such as an uneven portion of the surface, as the guard 116 moves laterally. Similarly, the forward side of the guard 116 is curved so as to enable the guard 116 to ride over a surface in a forward direction when in use without snagging the surface.

It should be appreciated that the frame of the guide 116 has a predetermined curvature, and so possesses a generally dished undertray portion so as to prevent snagging when the guide 116 engages the ground whilst also providing a degree of spacing between the ground and the cutter piece 122. In this regard, the undertray portion 142 has the predetermined curvature, which extends laterally from side-to-side in a substantially curved manner. The predetermined curvature is generally parabolic in shape.

When in use, the guard 116 is attached to the protective cover 114 of the lawn trimmer 100 and extends around the rotatable cutter holder 120 and the cutter piece 122. A user powers up the lawn trimmer 100 and the cutting piece 122 begins to rotate. The user then passes the distal end 106 of the lawn trimmer 100 over the ground from which grass is growing. The user typically walks with the lawn trimmer 100 is a forward motion while sweeping or swaying the distal end 106 of the lawn trimmer 100, comprising the rotating cutting piece 122, from side-to-side. Grass that is sufficiently long passes through the apertures of the guard 116 and is cut by the rotating cutting piece 122. However, the guard 116 also prevents engagement of the rotatable cutter holder 120 and the cutter piece 122 with the ground as the powered cutting tool 112 of the lawn trimmer 100 is translated over the ground. Likewise, any lateral solid objects or obstacles that are too large to pass through the apertures of the guard 116 contact or strike the frame of the guard 116 and so the rotatable cutter holder 120 and the cutter piece 122 are protected from harm.

The skilled person should appreciate that the above-described implementations are merely examples of the various implementations that are conceivable within the scope of the appended claims. Indeed, the structure of the guard 116 described above is just one configuration and in other examples, the frame of the guide 116 can be configured differently, for example the guard 116 can be longitudinally elongate and laterally curved. In this regard, whereas the support frame 140 described above is generally circular, the support frame can be generally rectangular. Additionally or alternatively, the guard 116 can comprise downwardly depending lateral apertured side portions. The downwardly depending lateral apertured side portions can respectively be inwardly curving substantially rectangular frames. The inwardly curving substantially rectangular frames can also comprise the above-mentioned lateral wing portions.

While in the above examples the lateral portions of the guard 116 are substantially symmetrical, it should be appreciated that the configuration of one lateral portion of the guard 116 can differ from the configuration of the other lateral portion of the guard 116.

In other embodiments, different guides 116 can be provided to accommodate different grass cutting heights. In this regard, the spacing between the support frame 140 and the undertray portion 142 can differ for different desired cutting heights. In other examples, the guide 116 can be adjustable, for example the frame can be adjustable or different points of attachment for the guide 116, for example to the protective cover 114, can be provided.

In the above example, the guide 116 is described as being coupled to the protective cover 114. However, in other examples, the guide 116 can be coupled to another part or parts of the lawn trimmer 100, for example the housing 118 of the powered cutting tool 112.

What is claimed is:
1. A lawn trimmer comprising:
a powered cutting tool comprising a motor operably coupled to a rotatable cutter holder, the rotatable cutter holder being operably coupled to a cutting piece; and
a guard; wherein
the rotatable cutter holder has a forward side and first and second lateral sides;
the guard is configured to extend substantially from the first lateral side to the second lateral side around the front side of the rotatable cutter holder;
the guard is configured to provide space for the cutting piece to rotate freely within the guard; and
the guard is an apertured barrier that provides a protective buffer between the cutting piece and a ground surface, thereby preventing engagement of the rotatable cutter holder with the ground surface when the powered cutting tool is translated over the ground surface.

2. The trimmer according to claim 1, wherein the guard extends so as to provide a predetermined curvature.

3. The trimmer according to claim 2, wherein
the guard comprises an undertray portion having the predetermined curvature, the predetermined curvature extending from side-to-side laterally; and
the predetermined curvature is substantially parabolic.

4. The trimmer according to claim 1, wherein the guard is a cage.

5. The trimmer according to claim 1, wherein the guard is a frame.

6. The trimmer as claimed according to claim 1, wherein the guard defines an opening at the forward side of the rotatable cutter holder, the opening being configured to receive, when in use, grass therethrough.

7. The trimmer according to claim 6, wherein the opening is configured to guide, when in use, grass to the cutting piece.

8. The trimmer according to claim 1, wherein the cutting piece is a plastic cord or a moulded cutter.

9. The trimmer according to claim 1, further comprising a stalk having a first end operably coupled to the powered cutting tool, and a second end comprising a handle.

10. The trimmer according to claim 1, wherein the guard is removable.

11. The trimmer according to claim 1, wherein the guard comprises a first stem and a second stem spaced from the first stem, and the powered cutting tool comprises a first mounting point and a second mounting point respectively configured to receive securely the first stem and the second stem.

12. The trimmer according to claim 1, wherein the guard is open at lateral sides thereof to permit the passage, when in use, of grass therethrough while preventing contact of the cutting piece with the ground surface or a lateral object.

13. The trimmer according to claim 1, wherein the guard comprises a support frame and an undertray portion depending downwardly from the support frame and beneath the support frame.

14. The trimmer according to claim 13, wherein the undertray portion is substantially parallel with and in spaced relation to the support frame.

15. The trimmer according to claim 13, wherein the undertray portion comprises a lateral first wing portion.

* * * * *